May 2, 1950
R. HARDY
2,506,500
DEVICE FOR SIMULTANEOUS INDICATING AND RECORDING SIGNALS
Filed July 16, 1946
3 Sheets-Sheet 1
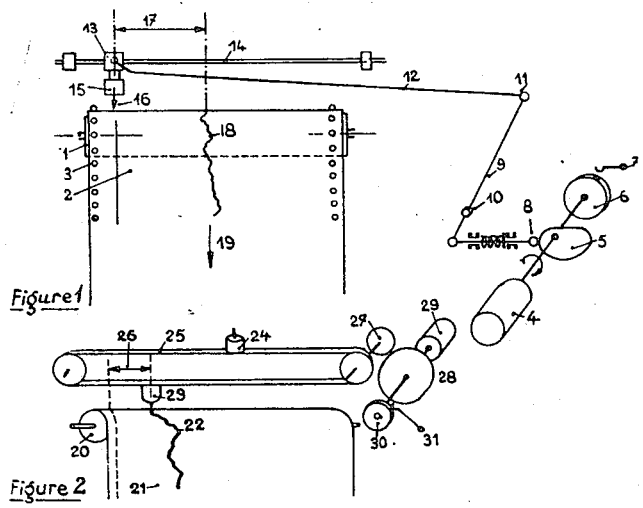
Figure 1
Figure 2
Figure 3
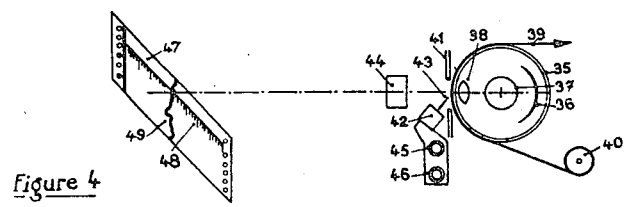
Figure 4
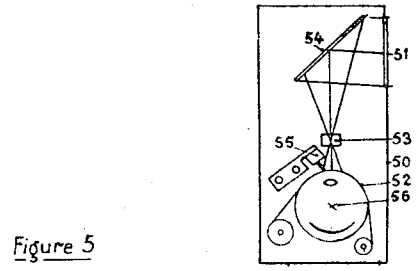
Figure 5
INVENTOR:
RENÉ HARDY
John B. Brady
attorney

INVENTOR:
RENÉ HARDY

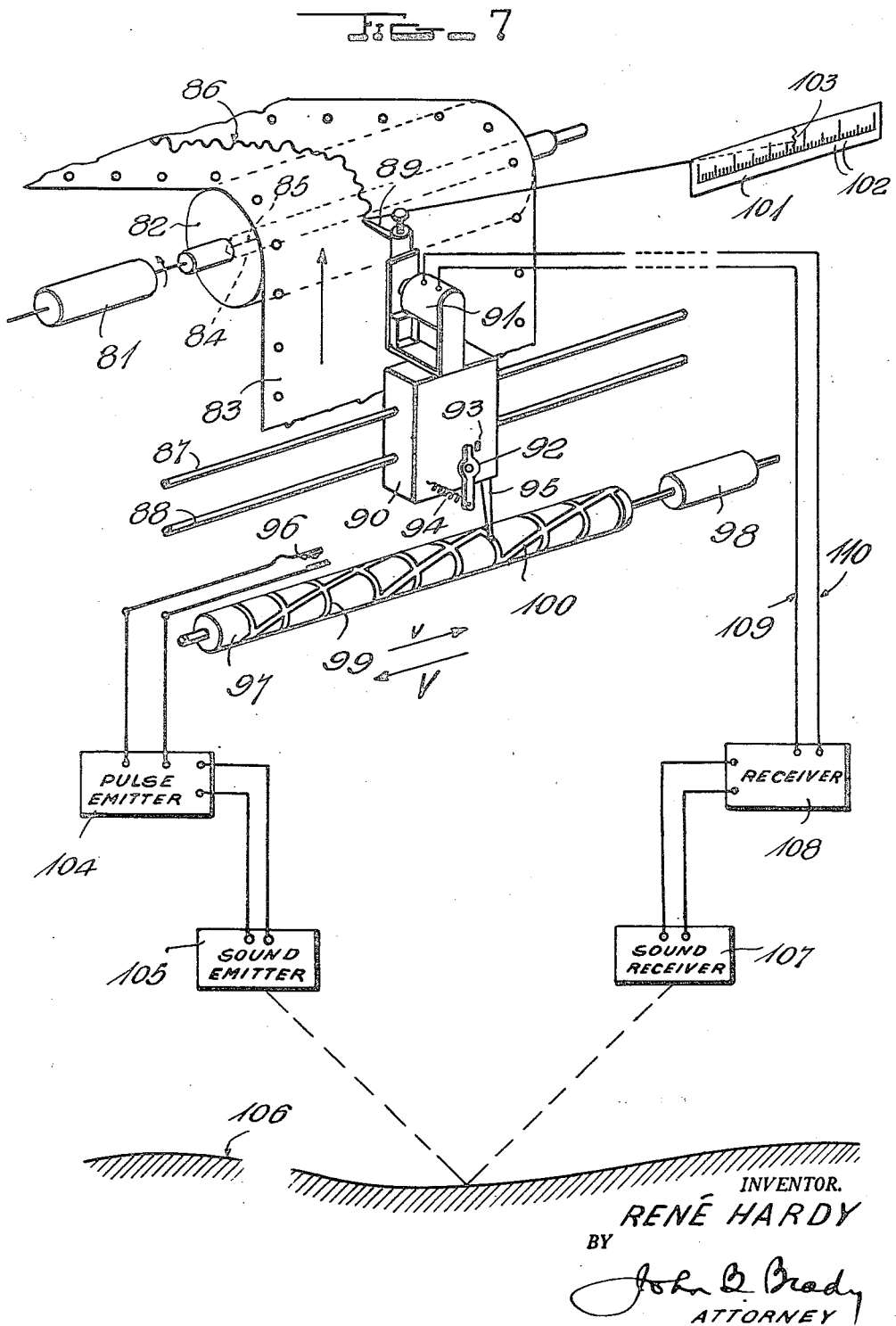

Patented May 2, 1950

2,506,500

UNITED STATES PATENT OFFICE 2,506,500

DEVICE FOR SIMULTANEOUS INDICATING AND RECORDING SIGNALS

René Hardy, Paris, France, assignor to Societe Francaise Radio Electrique, a corporation of France Application July 16, 1946, Serial No. 684,045
In France June 12, 1942

Section 1, Public Law 690, August 8, 1946
Patent expires June 12, 1962

1 Claim. (Cl. 346—77)

This invention relates to a device for simultaneous indicating and recording, applicable to ultra-sonic sounders and other applications.

As relating to a device particularly applicable to ultra-sonic sounders, the invention permits the construction of sounders where the indication of depth appears in a permanent manner.

Sounding devices by means of ultra-sound utilize generally a transmitter that transmits a brief train of waves every time a disc or revolving system passes in a determined position. When the echo comes back, it flashes, generally, a luminescent tube placed on the revolving member or determines in another way a trace which, through the difference of time, permits of knowing the depth.

According to the limit of depth of the apparatus, the transmission takes place every half-second, or every second, or, for great depths, sometimes every 10 seconds for instance.

It is known that the wave train—and, following, the echo—is very brief (of the order of the thousandth of second) and there is experienced that the periodical indication of a slow rhythm has a scintillating or twinkling effect.

The present invention provides a means for rendering continuous the indication in such manner that the navigator has at every moment an immediate reading by a simple, rapid observation of the dial of the apparatus, so that he would not be obliged to wait for one or several echoes for knowing the depth.

The indication furnished according to the invention appears to be continuous and, moreover, with a much greater luminous intensity.

Another characteristic of the invention is to simplify the necessary equipment and to embody in one single apparatus the visual indicator and the registering system.

It is known that the practice has evidenced the advantage of a continuous recording of the operations.

Generally a recorder is associated to the visual indicator and it is necessary either to achieve the electrical synchronism between these two instruments, or to link them mechanically, this irrespective of the bulk resulting from the plurality of the parts.

The characteristics of the invention and of the modifications of embodiment, of non limitative character are described hereinafter and illustrated by the accompanying drawings in which:

Figure 1 represents a recorder for an ultrasonic sounder according to a known principle, which will be used for describing the invention;

Fig. 2 shows another way of carrying out the driving of the graver;

Fig. 3 represents a drive through a screw having two inverted threads;

Fig. 4 represents a modification of embodiment of and according to the invention, of a recording indicator;

Fig. 5 is another embodiment of the invention;

Fig. 7 is a perspective view showing the co-action of the parts of the system of my invention.

Figure 6:
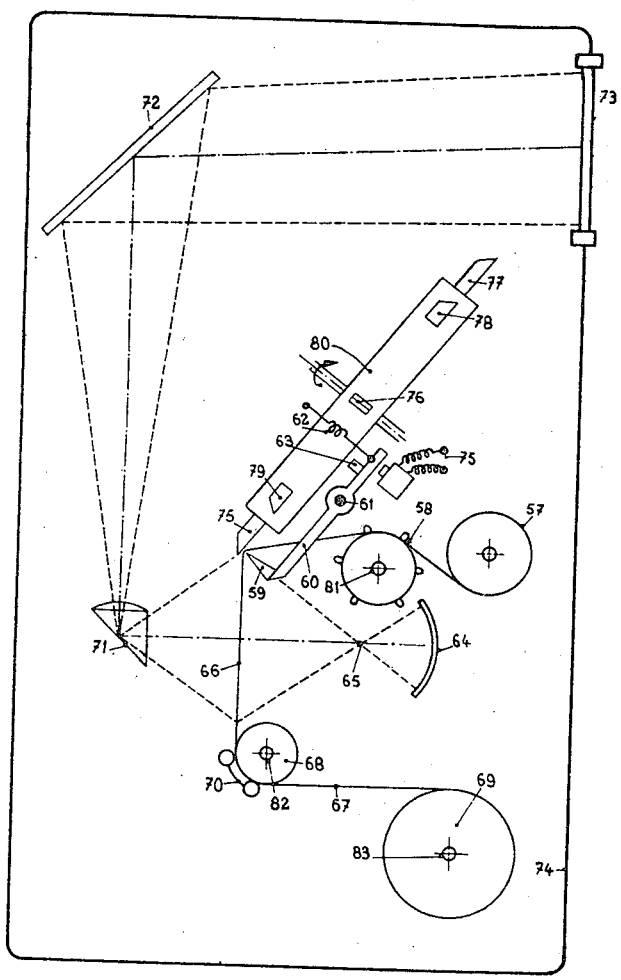
Fig. 6 shows a further modification of the system of my invention.

The diagrammatic drawing of Fig. 1 shows a recording system where 1 is a drum slowly propelling a film or band 2 of paper, for instance paraffined, in the direction 19.

Drum 1 is mechanically linked to the motor 4, which drives a cam 5 and a collector 6.

Cam 5, through the levers 9 and 12, causes the carriage 13 to displace with a slow motion from the left to the right. This carriage carries an electromagnetic graver, the stylet 16 of which is near the paper band 2.

Every time, when the graver starts from the left side, a contact 7 starts the transmission of a brief wave train and the echo determines, at the arrival thereof, a trace 18 on the paper of the recorder.

This conventional device of a recorder may also be constructed with such a band as 25 (see Fig. 2) that drives one or several gravers 23, 24 for instance.

For driving the graver, it is also possible to use, as it is well known, a screw having two threads (see Fig. 3), one of them, 23, bringing back very quickly the graver to the starting point, the other 34 moving it slowly from the left to the right.

If such systems should be used for replacing the usual visual indicator, it might be contemplated to illuminate strongly the recorded surface and project the image thereof, on a transparent screen for instance.

But such a system would have various drawbacks.

The bands of recording have generally 20 cm. of width and the thin trace is one or two tenths of a mm. thick. There are four or five lines in one millimeter.

The progression of the film is slow and the observation of the indications would be done on traces marked at the time of echoes which are anterior by several lines, that is to say with an appreciable delay.

Moreover, contrasts and luminosity would be defective in such a system and optics would be complicated.

The object of this invention is to provide a means for producing a luminous image through simple means and this image, taken at the time of the sounding, gives, without delay relatively to the operations, the clear indications of the depth.

The system which will be described hereinafter and is represented in Fig. 4, is one of the modifications of embodiment wherein 35 is a transparent drum, for instance made of glass, and of a sufficient diameter for allowing the projection through a transparency of a luminous linear source 37 by means of the mirror 36 and of the cylindrical lens 38.

There is used a film or a band of cellophane or other translucid material, covered with a black substance fundamentally constituted for instance with lamp-black and paraffine, the whole having little thickness.

This film 39, is slowly driven on while the graver 42, supported on a carriage and gliding rods 45, 46, is drawn laterally.

The useful width of the film is for instance 5 cm. and the stylet of the graver has one or two tenths of a millimeter of diameter at its extremity.

It has no contact with the film, but under the effect of the modulation, that is as soon as an echo is produced, it strikes the film, blackened in any suitable manner and draws a groove or makes a point according to the width of the echo.

At this place the film 39 becomes transparent and the image of the trace produced is projected by the object glass 44 on a screen 47 of frosted glass which comprises a graduated scale for the visual indication of depth.

The image on the screen 47 may be enlarged and has 20 cm. of length for instance, it being admitted that the travelling of the graver is 5 cm. long.

If the advance of film 39 is ½ mm. for every line described and if one line is described every half-second, film 39 will unroll at the rate of 1 mm. per second, that is 360 mm. per hour, which is not much and the image on the screen will "fall" at the rate of 2 mm. for one line, that is 4 mm. per second.

It will be possible to follow very clearly the indications of the soundings which will successively appear with a great luminosity.

The strain imposed to the graver is small and very little energy will be needed, this type of recording not differing from those already well known.

It is possible to advantageously use the resonance of the graver at the very frequency of the ultra-sounds, say for instance 15.000 periods with magnetostriction transmitters and thus to hammer 15 times during an echo of $1/1000$ of a second, which approaches resonance, and permits of attaining for the stylet a sufficient amplitude of displacement for little energy and will avoid scraping of the coating of paraffined black.

Fig. 6 shows a modification of embodiment which is a recorder for ultra-sonic sounder, of a reduced size and allowing recording and visual observation of the indication.

The film on which the echoes will be recorded comes from coil 57 and passes through a slow unroller 58 which makes it regularly progress at the rate of $\frac{1}{10}$ of mm. for one sounding.

The film or transparent substance, such as cellophane is covered with a thin layer that may be fundamentally constituted with lamp-black and paraffine and prevents the light from going through.

An optical system 64 focuses behind the film the rays of the luminous source 65. The film goes, past unroller 58 on a knife-edge or wedged ruler 59 which is maintained at every extremity by a small lever arm 60 abutting on lug 63 and drawn by the spring 62.

The film passes before the ruler and is then tightened and driven by drum 68 which, through a friction drive, tends always to go faster than 58 and owing to this, keeps constantly plane the surface 66 of the film.

The film is maintained by the presser 70 and then rolled on the drum 69.

An optical, prismatic system 71, projects through the mirror 72 the image of 66 on a frosted glass 73 permitting the observation of the trace left by the recording.

This recording takes place in the following manner.

The drum 80, turning at constant speed, bears on the periphery thereof, very thin pins 75, 76, 77, 78 which are regularly spaced and of such a size and disposition that when the drum revolves, a pin passes before the ruler or knife-edge 59, which is approximately orthogonal, and leaves the extremity of the said ruler when a second pin reaches the other extremity.

Knife-edge and pins have no contact at rest; they are at a few tenths of millimeters of distance and the film passes between both, without being "scratched" by the pins.

When an echo comes to the receiver, it actuates the electro-magnet 75, which imparts a sudden movement of the ruler, and the film, for a very short time, meets with the pin which has been thrust forward and is then at an angular position characterizing the distance of the echo.

By reason of the contact thus produced, it results that the black layer is taken off at that place and the echo is marked by the transparency of the film. It may be observed on the screen 73.

At every virtual line described by the crossing of a pin and a knife-edge in the course of the revolution of the drum, there is created a brief wave train of the order of the thousandths of the second, which is transmitted at the beginning and an echo which comes on after a time which characterizes the depth.

The succession of echoes with the slow displacing of the film gives a drawing of the depth as the ship proceeds.

The small width (4 or 5 centimeters) which is used for the film, permits of constructing a light support for the knife-edge and besides, it has only to be responsive to frequencies inferior to one thousand periods per second.

Of course a great number of modifications are possible and the described system is in no way limitative; for instance, instead of a drum, it is possible to engrave flat on a transparent screen or otherwise to construct an apparatus of a small size, such as the one represented in Fig. 5 where a mirror 54 reflects on the screen 51 the image of the drum 52. It is also possible to utilize movable marks of different colorations of the image or luminous source for differentiating certain indications.

Fig. 7 shows the system of my invention in perspective, wherein, a motor 81 drives a transparent cylinder 82 upon which the transparent band 83 is guided, said band being covered by a layer of opaque material (for example paraffin or lamp-black). A stylus mechanism, mounted on a carriage 90 moving on the sliding bars 87, 88, is driven by means of a pin 95 and a spindle 97, rotated by the motor 98. Said spindle has two pitches, one, 99, for the advance, at a velocity $v$, and the other, 100, for the rapid return movement at a greater velocity V. Furthermore, the carriage 90 has a small lever 92, retained in position by a return spring 94. Said spring is so weak that the lever, when passing the contact of the circuit breaker 96, does not close the circuit of the latter during the rapid return movement in the direction V. But when the carriage moves in the direction $v$, the lever 92, drawn by the spring 94 against the abutment 93, closes the circuit breaker 96 and causes the emission of a sound wave by means of a generator 104 and the transmitter 105. The echo on the ground 106 of said sound is received at 107 and causes the interruption of the current of the electro-magnet 91 of the stylus by means of the receiver 108, and the feed wires 109 and 110. Said electro-magnet 91 attracts normally the stylet 89; the current supplying the electro-magnet being interrupted by the signal to be recorded, the stylet is no longer attracted by the electro-magnet and is then pressed against the band 83 whereupon it traces a transparent curve 86 by scratching the opaque substance layer 86. By means of an optical system in the interior of the cylinder, diagrammatically illustrated by the lamp 84 with filament 85, said curve is projected upon the screen 101 at 103. The screen is provided with a graduation 102, the values read on said screen permitting an instantaneous reading of the depths to be measured.

Fig. 7 shows particularly how the stylus produces the curve 86 on the transparent band and how it is synchronized first by the emission of a sound wave and second by the receipt of the echo of said sound wave.

The system which is the object of the present invention offers the advantage of furnishing permanently the indications which are, in the case of the well known visual indicators, constituted by brief flashes or traces, produced at the time of the passage of the echo and necessitating from the navigator a too great attention.

The system described has no limitative character and may apply to other fields, every time it is desired to observe a recording and also in applications where there was utilized until now a separate visual indicator for the observation.

What I claim is:

A system for simultaneously indicating and recording signals spaced in time, applicable to ultra-sonic sounders and the like, comprising: a transparent band covered with a thin layer of opaque readily scratchable substance, a scratching device ending in a fine stylet adjacent said band and normally spaced a very small distance from it, a light source located behind the band for illuminating the same, a screen presenting a graduated scale and located at a distance from the band and from the light source, means for imparting to the band and to the scratching device, respectively, uniform movements of displacement, perpendicular to each other, and at constant speeds, means translating any signal to be recorded into a mechanical action on the scratching device, enabling the stylet, during the entire duration of the signal and only during that duration to remain in contact with the band and to scratch thereon the layer of opaque substance along a furrow whose length will depend on the duration of the signal, and means for projecting on the aforementioned screen the light rays of the source, traversing the now transparent furrows of the band thus enabling the formation of a real and enlarged image of the said recorded furrows.

RENÉ HARDY.

REFERENCES CITED

The following references are of record in the file of this patent:

UNITED STATES PATENTS

| Number | Name | Date |
| --- | --- | --- |
| 1,681,460 | Bruhn | Aug. 21, 1928 |
| 1,858,931 | Langevin et al. | May 17, 1932 |
| 2,186,268 | Pakala | Jan. 9, 1940 |
| 2,251,332 | Gray | Aug. 5, 1941 |